United States Patent
Räsänen et al.

(10) Patent No.: US 9,128,483 B2
(45) Date of Patent: Sep. 8, 2015

(54) METHOD AND ARRANGEMENT FOR CONTROLLING ENERGY CONSUMPTION IN A MARINE VESSEL

(75) Inventors: Jan-Erik Räsänen, Helsinki (FI); Heikki Bergman, Sipoo (FI)

(73) Assignee: ABB OY, Helsinki (FI)

(*) Notice: Subject to any disclaimer, the term of this patent is extended or adjusted under 35 U.S.C. 154(b) by 0 days.

(21) Appl. No.: 13/168,335

(22) Filed: Jun. 24, 2011

(65) Prior Publication Data
US 2011/0320073 A1    Dec. 29, 2011

(30) Foreign Application Priority Data
Jun. 24, 2010   (EP) .................................... 10167129

(51) Int. Cl.
*G06F 7/00*     (2006.01)
*G05D 1/00*     (2006.01)
*G01C 21/20*    (2006.01)
*B63J 99/00*    (2009.01)

(52) U.S. Cl.
CPC ............ *G05D 1/0005* (2013.01); *G01C 21/203* (2013.01); *B63J 2099/006* (2013.01); *Y02T 70/74* (2013.01)

(58) Field of Classification Search
CPC . G05D 1/0005; G05D 1/0217; G01C 21/203; B63B 51/00; B63B 51/02; B63B 51/04; B63J 2099/006; B63J 2099/008; B63H 21/20
USPC ............................................................. 701/21
See application file for complete search history.

(56) References Cited

U.S. PATENT DOCUMENTS

| | | | |
|---|---|---|---|
| 2005/0034023 A1* | 2/2005 | Maturana et al. ............... | 714/37 |
| 2005/0127680 A1* | 6/2005 | Lof et al. ......................... | 290/44 |
| 2005/0141154 A1* | 6/2005 | Consadori et al. ............. | 361/62 |
| 2007/0090808 A1* | 4/2007 | McCabe et al. ............... | 320/137 |
| 2010/0023239 A1 | 1/2010 | Self et al. | |
| 2010/0283318 A1* | 11/2010 | Crane et al. .................... | 307/9.1 |
| 2010/0284117 A1* | 11/2010 | Crane .......................... | 361/93.1 |

FOREIGN PATENT DOCUMENTS

WO   WO2008/096376 A1 *   8/2008

* cited by examiner

*Primary Examiner* — Thomas G Black
*Assistant Examiner* — Ce Li
(74) *Attorney, Agent, or Firm* — Buchanan Ingersoll & Rooney PC

(57) ABSTRACT

An apparatus and a method are disclosed for controlling energy consumption in a marine vessel having a plurality of energy consuming users and fuel consuming engines. An exemplary apparatus includes a voyage management tool for planning a route for the marine vessel and for estimating energy consumption on the route; an energy management tool for predicting energy consumption; and control tool for managing an energy balance on the route.

16 Claims, 3 Drawing Sheets

METHOD AND ARRANGEMENT FOR CONTROLLING ENERGY CONSUMPTION IN A MARINE VESSEL

RELATED APPLICATION

This application claims priority under 35 U.S.C. §119 to European Patent Application No. 10167129.5 filed in Europe on Jun. 24, 2010, the entire content of which is hereby incorporated by reference in its entirety.

BACKGROUND INFORMATION

In a marine vessel, the energy to generate power to the propulsion unit or to other devices onboard is be stored into the marine vessel. In a seagoing vessel, fuel like oil is used as a source of energy and a diesel engine is used as a main engine. In a large marine vessel there may be several diesel engines that rotate generators or main propellers of the vessel. The fuel is delivered to the marine vessel in the harbors or during the voyage by fuel tankers. Other primary source of energy, like liquid natural gas has also been used.

The power production and propulsion system can be adjusted, controlled and monitored continuously to achieve the optimal efficiency. The power control is a part of the control system used to gain the result of the system. Likewise the propulsion system is controlled to produce power using the available electric and/or primary energy. In practice the sufficiency of the energy has not been as important as the efficiency of the devices and their control systems.

The power control of separate devices can allow for energy consumption efficiently and economically. This is valid for individual propulsion units, pumping devices, lighting and heating equipments. Further different kind primary energy sources can be used parallel and simultaneously. There may be different kind of fuels available and there may be several diesel engines that are driven parallel or sequentially depending on the power demand. All of these factors and the price of the fuel, the quality of the fuel and the availability of the fuel can affect overall energy efficiency of the marine vessel.

Published US patent application US2010/0023239 discloses a power demand management method, which determines the power demand on a power subsystem by optimizing a respective demand-dependent operating characteristic based on one or more operating conditions affecting the power subsystem.

SUMMARY

A method is disclosed for controlling energy is disclosed consumption in a marine vessel which has a plurality of energy consuming users and fuel consuming engines, wherein the energy consuming users are divided into at least first and second user groups, each user group having their own energy demands and energy characteristics, the method comprising: planning a route for the marine vessel considering one or more of: weather forecast, sea currents, and sea depths by calculating at least external forces the marine vessel will face on the route; estimating energy consumption for each user group based on the route; predicting energy consumption for each user group considering one or more of: fuel type, fuel price, emission targets, and efficiency of each consumer; and managing an energy balance between the user groups during the route.

An apparatus is also disclosed for controlling energy consumption in a marine vessel which has a plurality of energy consuming users and fuel consuming engines, wherein the energy consuming users are divided into at least first and second user groups, each user group having their own energy demands and energy characteristics, the apparatus comprising: a voyage management tool for planning a route for the marine vessel considering one or more of: weather forecast, sea currents, and sea depths by calculating at least external forces the marine vessel will face on the route and for estimating energy consumption for each user group based on the route; an energy management tool for predicting energy consumption for each user group considering one or more of: fuel type, fuel price, emission targets, and efficiency of each consumer; and a control tool for managing an energy balance between the user groups during the route.

BRIEF DESCRIPTION OF THE FIGURES

The invention will be described in detail with the help of exemplary embodiments referring to the drawings wherein.

DETAILED DESCRIPTION

Figure 1:
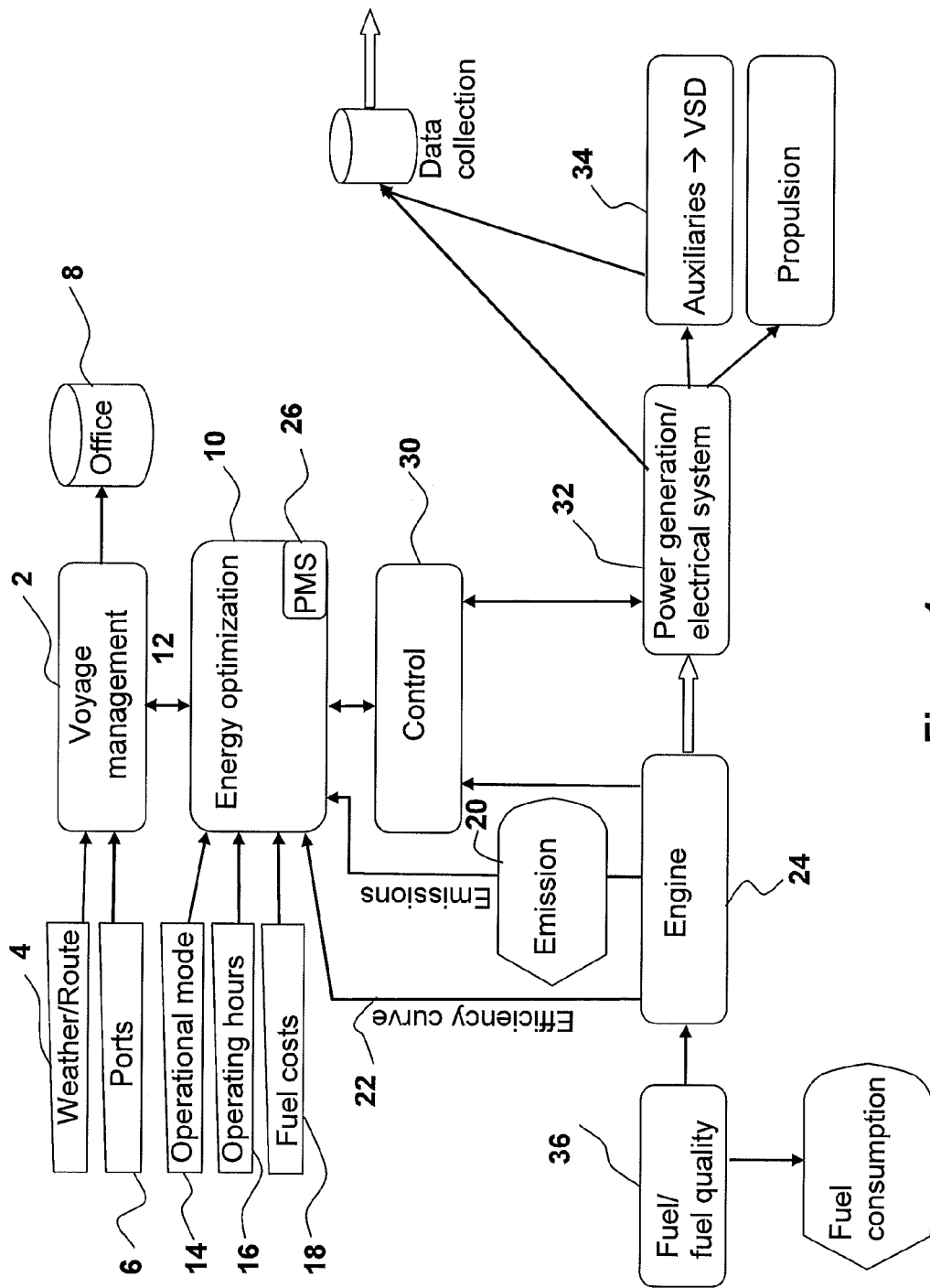
FIG. 1 shows a block diagram of an exemplary embodiment as disclosed herein.

A method is disclosed for energy management that can result in high energy efficiency and take into account parameters that are dependent on a primary source of energy or that have a context with overall energy efficiency in the marine vessel.

An exemplary method for controlling energy consumption in a marine vessel is disclosed, which has a plurality of energy consuming users and fuel consuming engines, wherein energy consuming users are divided into at least first and second user groups, each user group having their own energy demands and energy characteristics. An exemplary method includes planning a route for the marine vessel considering one or several items (e.g., variable parameters) of a plurality of such items including: weather forecast, sea currents, and sea depths by calculating at least external forces the marine vessel will face and/or faces on the route; estimating energy consumption for each user group on the route; predicting energy consumption for each user group considering one or several of a second plurality of items: fuel type, fuel price, emission targets, and efficiency of each consumer, and managing an energy balance between the user groups during the route.

The apparatus can control energy consumption in a marine vessel, which has a plurality of energy consuming users and fuel consuming engines, wherein the energy consuming users are divided into at least a first and second user groups each user group having their own energy demands and energy characteristics. The apparatus can include a voyage management tool (2) for planning a route for the marine vessel considering one or several items of a plurality: weather forecast, sea currents, sea depths by calculating at least external forces the marine vessel will face and/or faces on the route and for estimating energy consumption for each user group on the route, an energy management tool (10) for predicting energy consumption for each user group considering one or several of a second plurality of items: fuel type, fuel price, emission targets, and efficiency of each consumer, and control tool (30) for managing an energy balance between the user groups during the route.

Different energy consumers can have different characteristics in respect of their controllability, in respect of their energy variation and in respect of their power demand and energy demand in different modes of operation of the vessel, for example. The different modes of operations, like drive in harbor, open sea drive or maneuvering drive, have different kind of demands. This observation can be exploited when defining the overall energy consumption and when adjusting the energy balance or energy distribution between the consuming devices.

Basically, exemplary energy consuming devices in the vessel can be divided in two categories. The first one can be called propulsion energy, whose duty is to move and guide the vessel from the port of departure to the port of destination. The second one can be called non-propulsion energy or base load that includes several energy consuming devices, which are running onboard all the time onboard, totally or at least partially independent of the movement of the vessel or the requirements of the propulsion, of the steering or of the maneuvering.

In principle, the base load is continuous load and includes a certain amount fuel to develop energy and to generate the power to fulfill its demand. However, the base load demand varies continuously, because the environmental circumstances affect to it and because the operation mode of the vessel has effect to the base load. In addition the base load includes energy consuming devices that can be driven in an energy saving mode for short or even longer time periods. These loads can be switched off when auxiliary power is used for the propulsion or steering.

A method is disclosed for controlling energy consumption in a marine vessel, which has a plurality of energy consuming users and fuel consuming engines, and includes planning a route for the marine vessel considering one or several items of a plurality: weather forecast, sea currents, by calculating at least the external forces the marine vessel will face and/or faces on the route, for estimating energy consumption on the route, for predicting energy consumption considering one or several of a second plurality of items: fuel type, fuel price, emission targets, and efficiency of each consumer and for managing an energy balance and/or load shedding on the route.

According an exemplary embodiment, the first user group includes propulsion or steering devices and the second user group includes non-propulsion devices.

According another exemplary embodiment, at least the second user group is able to store energy. The non-propulsion loads may include cooling or ventilation systems that can be driven to the upper limit before the oncoming and predicted growth of energy demand. During the high energy demand the ventilation or other energy consuming devices can be switched off until an allowable limit has been reached. By this way it is possible to avoid start additional diesel.

According another exemplary embodiment, the energy balance is updated continuously during the route. The changing circumstances are taken into account. The measuring data and the historical data can be utilized when updating the energy balance.

An exemplary embodiment can include forecasting/optimizing startings of the engines. The specified energy can be produced so that unnecessary starts are avoided. This can be made by switching of unnecessary loads for short periods and storing energy, for example. Further, the energy demand in the future can be predicted and the second user group controlled to store energy before power demand increases.

Another exemplary embodiment includes optimizing operating hours of the engines. Still another exemplary embodiment includes minimizing fuel costs when managing the energy balance.

Still another exemplary embodiment includes displaying and monitoring the energy balance. The personnel can use the updated information when controlling the devices.

In still another exemplary embodiment, present values of the items are measured and compared to historical data of the corresponding values when predicting and estimating energy consumption.

According to another exemplary embodiment, the route covers a voyage from the port of departure to the port of destination. This gives an overall view of the energy balance and will be updated when changes appear.

According to another exemplary embodiment, the route covers a partial trip having essentially constant circumstances, like operation mode and environmental circumstances According to another exemplary embodiment, the circumstances of prevailing and coming partial trips are considered.

The Base load or non-propulsion load can be optimized so that the energy production onboard as a whole is economical when combined with the propulsion load needs.

FIG. 1 shows an exemplary embodiment as a block diagram. As it later will be described in more detail the diagram includes blocks that represent either machine or control devices or data storing and data handling. The arrows from the blocks describe an output of the block in question and the arrows to the blocks describe an input of the block in question. The input arrow to a particular block transfers either input data outside the arrangement or output data from another block. The output from a particular block transfers either output data outside the arrangement or input data to another block.

In the Voyage management tool 2 the basic energy consumption estimate is calculated. Alternatively, the basic energy consumption estimate is calculated in another operational condition optimizing tool. The tool 2 is, for example, an external tool, where the voyage route planning is done. The weather and route information 4 are input to the voyage management tool 2. This weather and route information 4 includes e.g. weather forecasts, sea currents and other data that can be prognosticated by a fair probability. The ports data 6 is another input to the voyage management tool 2 and gives available information about the ports of the start point A, of the target point B and of any intermediate port between A and B. The ports data 6 also includes information related to ports in question. The voyage management tool 2 creates a route planning considering the input data and calculates the external forces the marine vessel will face during the complete voyage from point A to point B and on the basis of it the voyage management tool calculates an estimate for energy consumption for the complete voyage from A to B and this output 12 is forwarded as one input to the Energy optimization tool 10. The calculation result of the voyage management tool 2 is forwarded to memory 8 and stored therein.

The estimate for energy consumption 12 from the voyage management tool 2 is utilized in the Energy optimization tool 10 with several other inputs in order to make a prediction of the energy consumption. The input data to the Energy optimization tool 10 includes in this embodiment Operational mode 14 of the marine vessel, Operating hours 16, Fuel costs 18, Emissions 20 and Efficiency curve 22. The Energy optimization tool 10 may have other inputs depending on the modification of the energy management procedure. Operational mode 14 includes (e.g., consists of) the data and instructions that define the particulars according which the marine vessel is operating like open sea mode, port mode. The Operating hours 16 define the duration of the different operational modes and their sequences. The Fuel costs 18 gives the fuel types to be used and their availability and the fuel prices. Further the Energy optimization tool 10 has input from the Engine 24, which input includes (e.g., consist of) the Efficiency curve 22 of the power plant optimization as described later in more detail and the Emissions 20, whereby the emissions of the Engine is input to the Energy optimization tool 10 in order to compare the emissions with the emission target set by the rules or the authorities and limit the amount of the emissions below the target values.

The Power Management System (PMS) 26 of the marine vessel controls the total power production and delivery of the vessel. The PMS 26 may be integrated to the Energy optimization tool 10 as shown in the FIG. 1 or it may be realized as a separate unit that communicates with the Energy optimization tool 10. The PMS operation is extended to cover function outputs from to control unit 30, such as power shedding of consumers, function outputs from Power generation/electrical system unit 32, such as propulsion power prediction calculation and customer interface inputs, such as manual starting acceptance of new engine, in order to allow the PMS to utilize the whole range of input data and calculated predictions of operation in decision making of engine starting and stopping.

Control unit 30 is connected to Energy optimization tool 10, to the Engine 24 and to the Power generation/electrical system unit 32. The control unit 30 controls the actual load shedding profiles and load shedding of the system. The control unit 30 also will, based on process references, in an efficient way control the auxiliary consumers connected to the system.

Power generation/electrical system unit 32 generates the desired electrical power for the need of the vessel and creates the propulsion power for the propellers. Information from this unit 32 will be transferred to the energy optimization module to get all the basic data from load point to available power in order to find the right energy balance on the system. E.g. the number of generators is decided to produce the desired power most efficiently. The Power generation/electrical system unit 32 supplies the energy to the propulsion unit and to the all the electric power consuming devices that are symbolized as Auxiliaries/propulsion unit 34. Some of the devices may be variable speed controlled drives (VSD) which feature is utilized in the energy control as well.

The Fuel/fuel quality unit 36 has information of the available fuels and their characteristics in order to find the most efficient way of operation. The unit 36 enables the engine to operate in an efficient way and taking account of the emission targets. The fuel consumption is monitored and displayed by the unit 36.

An exemplary arrangement as disclosed herein also allows user to define consumption reduction buffers, which may be utilized by the Energy management prediction calculation. The propulsion efficiency model and propulsion features and phenomenon that do effect on the system level efficiency are integrated and modeled in the procedure. Based on the prediction, the energy balance management and possible load shedding are reported to the user during the whole voyage. Data generated in the total system are collected into a Data collection unit in a centralized mode to be able to give remote diagnostic and support.

Figure 2:
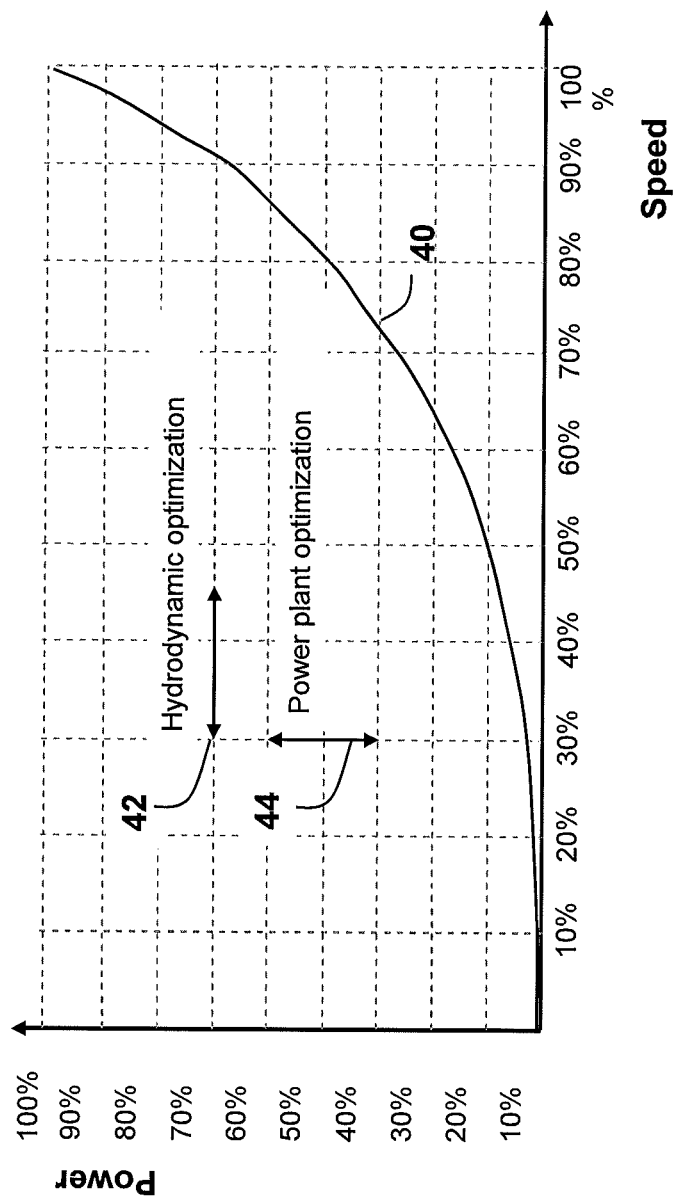
FIG. 2 shows a graph of an exemplary power demand of a vessel.

FIG. 2 shows an example of the energy efficiency curve to be used in an exemplary arrangement. A speed/power curve report is generated based on the actual external forces the vessel operates in. This speed/power curve 40 is presented in the diagram of FIG. 2 where power per unit is shown as a function of the vessel of the speed. The actual speed/power value will change several times during a voyage, for example when the vessel change course or comes in to shallow waters or the sea-current changes. In the diagram spots are identifying the efficiency point where the vessel has been. Based on the information of the efficiency spot at each moment, the crew of the vessel sees how efficient the operation is on-line. Based on the information, the crew may also take actions to get the vessel operating in a more efficient mode. The closer the vessel is to the line 40, the more efficient is the operation. Generally actions pursuing hydrodynamic optimization move the efficiency spot horizontally in the direction of line 42 and actions pursuing power plant optimization move the efficiency spot vertically in the direction of line 44.

Figure 3:
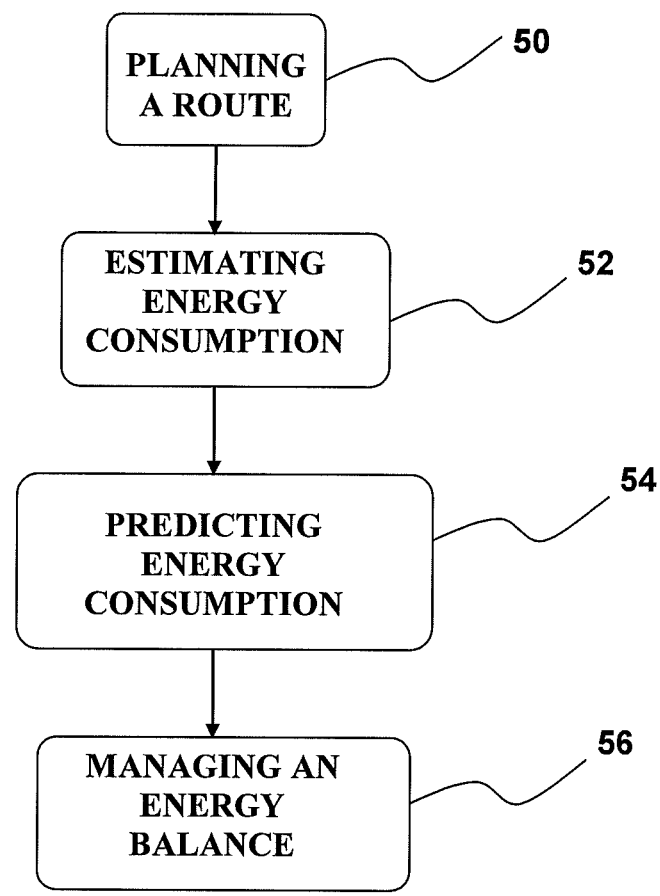
FIG. 3 shows an exemplary flow chart of a method as disclosed.

A method as disclosed herein is described as a flow chart in FIG. 3. Accordingly, in block 50 a route for the marine vessel is planned considering one or several items of a plurality: weather forecast, sea currents, and sea depths by calculating at least external forces the marine vessel will face and/or faces on the route. The energy consumption on the route is estimated in block 52, and the energy consumption is predicted in block 54 considering one or several of a second plurality of items: fuel type, fuel price, emission targets. In block 56 an energy balance on the route is managed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling energy consumption in a marine vessel which has a plurality of energy consuming users and fuel consuming engines, wherein the energy consuming users and the fuel consuming engines are divided into at least first and second user groups each user group having their own energy demands and energy characteristics, wherein the first user group comprises propulsion or steering devices and the fuel consuming engines, and the second user group comprises non-propulsion devices, the method comprising:

planning a route for the marine vessel considering one or more of: weather forecast, sea currents, and sea depths by calculating at least external forces the marine vessel will face on the route;

estimating energy consumption for each user group based on the route;

predicting energy consumption for each user group based on the estimated energy consumption and considering one or more of: fuel type, fuel price, emission targets, and efficiency of each consumer;

managing an energy balance between the user groups during the route by continuously updating the predicted energy consumption for the first and second user groups and inputting the updated predicted energy consumption into an operational mode configured to optimize operational conditions of the marine vessel; and load shedding of at least one of the non-propulsion devices of the second user group based on the predicted energy consumption of the first and second user groups, and wherein the load shedding occurs before power demand increases such that energy from the second user group can be stored during the load shedding.

2. The method according to claim 1, wherein startings of the engines are forecasted and/or optimized.

3. The method according to claim 1, comprising:
optimizing operating hours of the engines.

4. The method according to claim 1, wherein when managing the energy balance, fuel costs are minimized.

5. The method according to claim 1, wherein the energy balance is displayed and monitored.

6. The method according to claim 1, comprising:
measuring present values of parameters used for planning the route; and
comparing the present values to historical data of corresponding values when predicting and estimating energy consumption.

7. The method according to claim 1, wherein the route covers a voyage from a port of departure to a port of destination.

8. The method according to claim 1, wherein the route covers a partial trip having essentially constant circumstances.

9. The method according to claim 8, wherein the circumstances of prevailing and upcoming partial trips are considered.

10. The method according to claim 1, comprising:
utilizing the stored energy to avoid unnecessary startings of fuel consuming engines, which operate the non-propulsion devices of the second user group.

11. An apparatus for controlling energy consumption in a marine vessel which has a plurality of energy consuming users and fuel consuming engines, wherein the energy consuming users and the fuel consuming engines are divided into at least first and second user groups, each user group having their own energy demands and energy characteristics, and wherein the first user group comprises propulsion or steering devices and the fuel consuming engines, and the second user group comprises non-propulsion devices, the apparatus comprising:

a voyage management tool for planning a route for the marine vessel considering one or more of: weather forecast, sea currents, and sea depths by calculating at least external forces the marine vessel will face on the route and for estimating energy consumption for each user group based on the route;

an energy management tool for predicting energy consumption for each user group based on the estimated energy consumption and considering one or more of: fuel type, fuel price, emission targets, and efficiency of each consumer; and a control tool for managing an energy balance between the user groups during the route by continuously updating the predicted energy consumption for the first and second user groups and inputting the updated predicted energy consumption into an operational mode configured to optimize operational conditions of the marine vessel, and load shedding of at least one of the non-propulsion devices of the second user group based on the predicted energy consumption of the first and second user groups, and wherein the load shedding occurs before power demand increases such that energy from the second user group can be stored during the load shedding.

12. The apparatus according to claim 11, wherein startings of the engines are forecasted and/or optimized.

13. The apparatus according to claim 11, wherein the operational mode is configured to optimize operating hours of the engines.

14. The apparatus according to claim 11, wherein when managing the energy balance, fuel costs are minimized.

15. The apparatus according to claim 11, comprising:
a display configured to display the predicted energy consumption.

16. The apparatus according to claim 11, comprising:
utilizing the stored energy to avoid unnecessary startings of fuel consuming engines, which operate the non-propulsion devices of the second user group.

* * * * *